United States Patent
Blase et al.

(10) Patent No.: US 9,328,795 B2
(45) Date of Patent: May 3, 2016

(54) ENERGY GUIDE CHAIN WITH DEFORMABLE JOINT ELEMENTS

(75) Inventors: Günter Blase, Bergisch Gladbach (DE); Thilo-Alexander Jaeker, Sankt Augustin (DE)

(73) Assignee: Igus GmbH, Cologne (DE)

( * ) Notice: Subject to any disclaimer, the term of this patent is extended or adjusted under 35 U.S.C. 154(b) by 78 days.

(21) Appl. No.: 14/009,217

(22) PCT Filed: Mar. 30, 2012

(86) PCT No.: PCT/EP2012/055782
§ 371 (c)(1),
(2), (4) Date: Jul. 18, 2014

(87) PCT Pub. No.: WO2012/131033
PCT Pub. Date: Oct. 4, 2012

(65) Prior Publication Data
US 2015/0159733 A1    Jun. 11, 2015

(30) Foreign Application Priority Data
Apr. 1, 2011 (DE) ............... 20 2011 004 785 U

(51) Int. Cl.
*F16G 13/16* (2006.01)
*F16F 13/16* (2006.01)
*H02G 3/04* (2006.01)

(52) U.S. Cl.
CPC .............. *F16F 13/16* (2013.01); *H02G 3/0475* (2013.01)

(58) Field of Classification Search
CPC ...................................................... F16G 13/16
USPC .......................................................... 59/78.1
See application file for complete search history.

(56) References Cited

U.S. PATENT DOCUMENTS

| 4,813,224 A | 3/1989 | Blase |
| 6,349,534 B1 | 2/2002 | Zanolla et al. |

(Continued)

FOREIGN PATENT DOCUMENTS

| DE | 29607492 U1 | 8/1997 |
| DE | 10 2008 020 907 | * 11/2008 |

(Continued)

OTHER PUBLICATIONS

English translation of PCT International Search Report mailed Jul. 6, 2012, received in corresponding PCT Application No. PCT/EP12/55782, 6 pgs.

(Continued)

*Primary Examiner* — David B Jones
(74) *Attorney, Agent, or Firm* — Grossman Tucker Perreault & Pfleger, PLLC

(57) ABSTRACT

The invention relates to a cable carrier chain (1) for carrying cables, hoses or the like, having a plurality of links (2, 3) which form two parallel link strands connected by transverse webs and which can be angled relative to one another by means of articulated connection, wherein the articulated connection between adjacent links (2, 3) is formed by a joint element (5) which is elastically deformable in the angling direction of the links and which is preferably arranged in the longitudinal central plane (S2), which runs in the longitudinal direction of the cable carrier chain, of the links. According to the invention, in each link strand, in each case different inner links (2) and outer links (3) alternate in the longitudinal direction of the chain (1), wherein both the inner links and also the outer links are in each case of mirror-symmetrical form with respect to the vertical central plane (S1) thereof which runs perpendicular to the longitudinal direction, such that identical inner links (2) and identical outer links (3) can be used in both link strands. To secure adjacent inner and outer links (2; 3) in the longitudinal direction of the chain, the joint elements (5) have mirror-symmetrical opposite end regions (52).

41 Claims, 4 Drawing Sheets

(56) References Cited

U.S. PATENT DOCUMENTS

Figure 1:
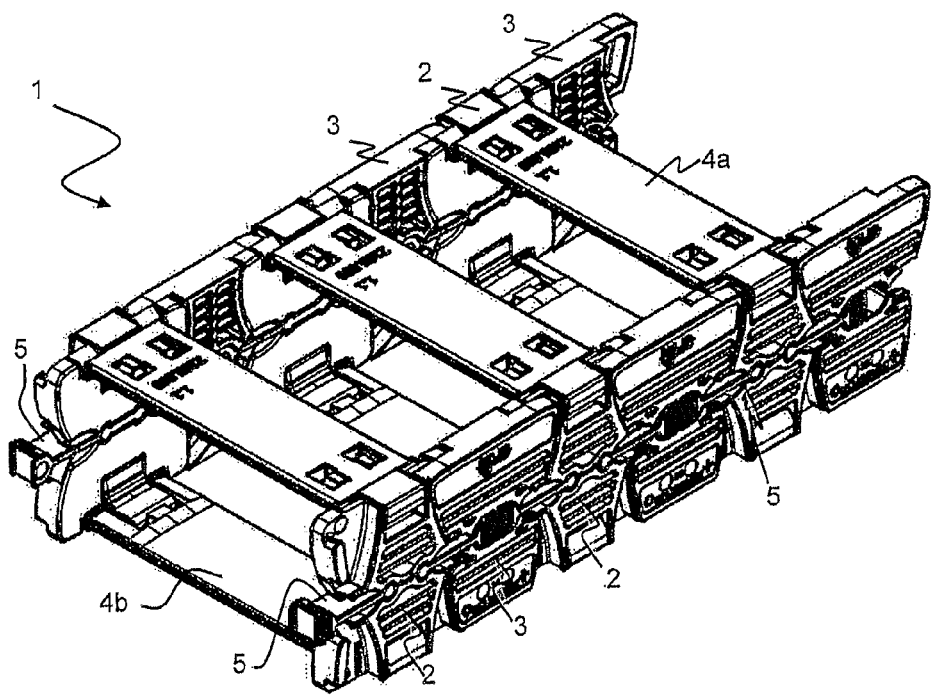

| | | |
|---|---|---|
| 6,745,555 B2 | 6/2004 | Hermey et al. |
| 7,310,937 B2 * | 12/2007 | Kim .............................. 59/78.1 |
| 7,513,097 B2 | 4/2009 | Utaki et al. |
| 7,637,092 B2 | 12/2009 | Utaki et al. |
| 7,669,402 B2 * | 3/2010 | Blase ............................ 59/78.1 |
| 7,677,024 B2 | 3/2010 | Utaki |

FOREIGN PATENT DOCUMENTS

| | | | |
|---|---|---|---|
| DE | 102008047323 A1 | | 4/2009 |
| DE | 10 2009 007 758 | * | 10/2009 |
| DE | 102008046701 A1 | | 3/2010 |
| WO | 02/086349 | * | 10/2002 |
| WO | 2008082037 A1 | | 7/2008 |

OTHER PUBLICATIONS

English translation of PCT International Preliminary Report on Patentability mailed Oct. 3, 2013, received in corresponding PCT Application No. PCT/EP12/55782, 7 pgs.

German Search Report dated Feb. 13, 2012, received in related German Patent Application No. 20 2011 004 785.7, 5 pgs.

* cited by examiner

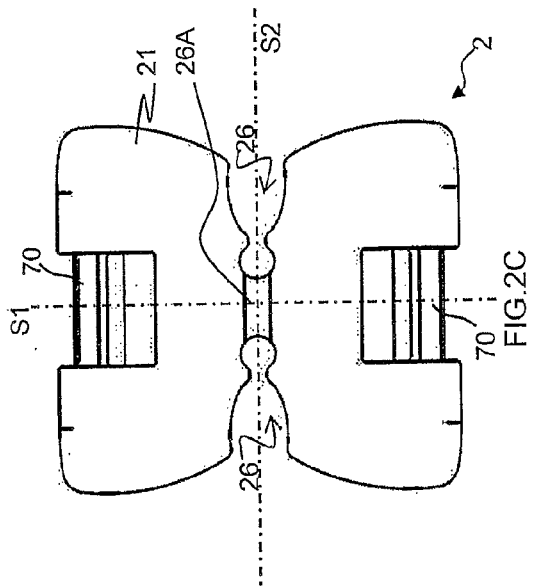
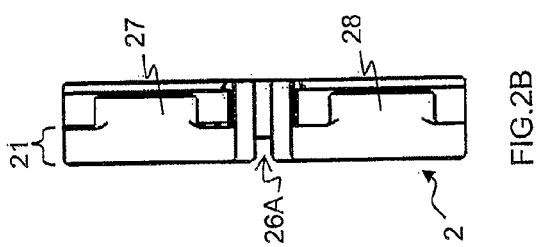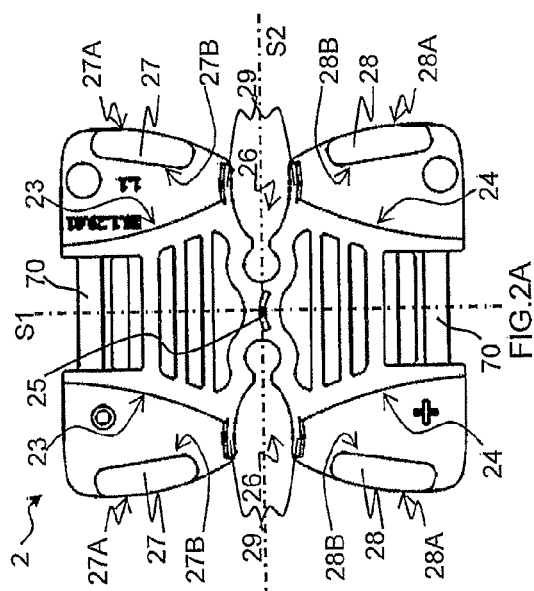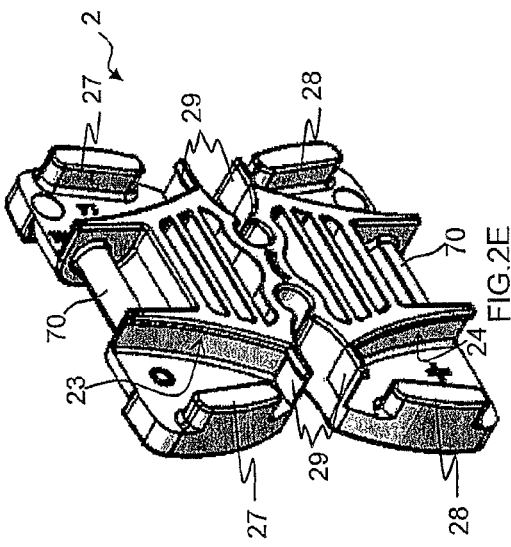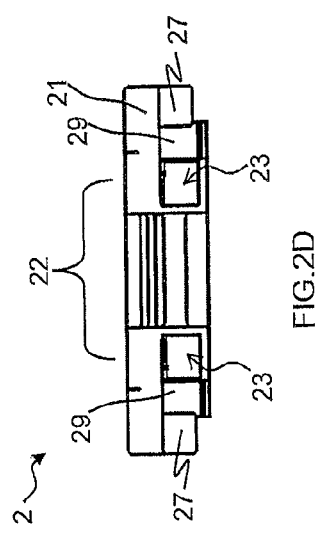

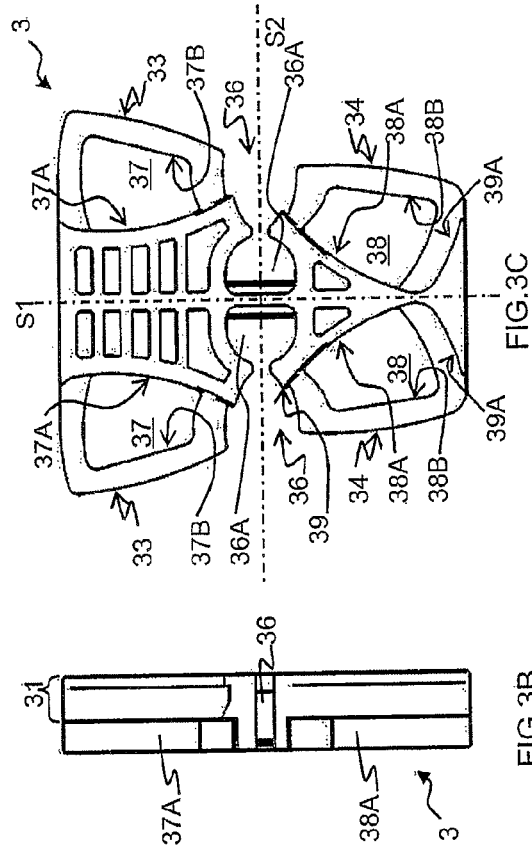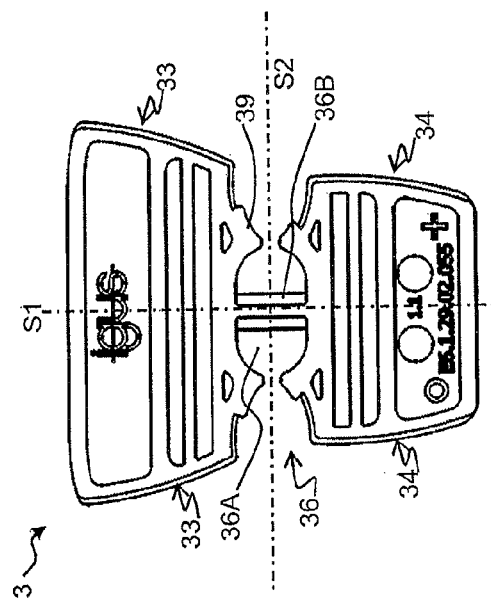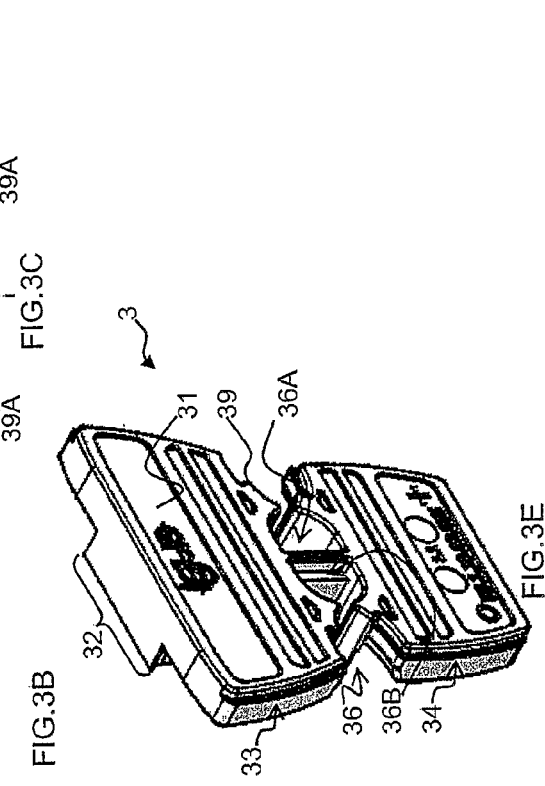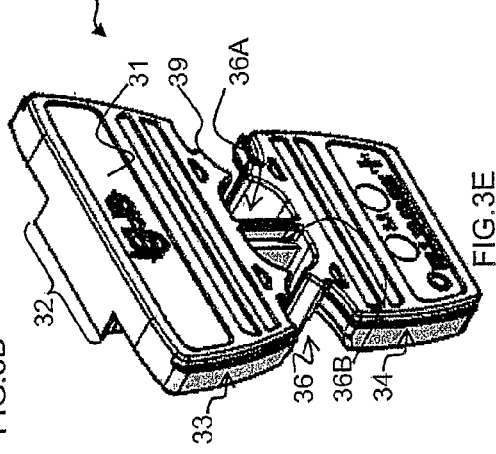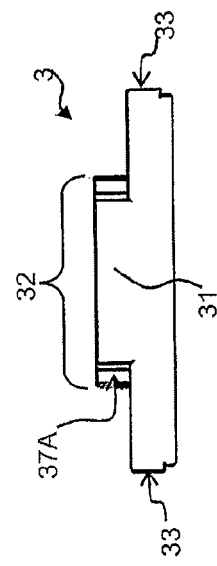

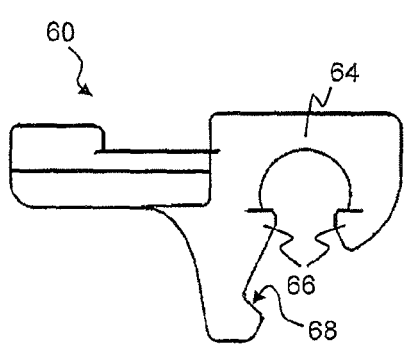
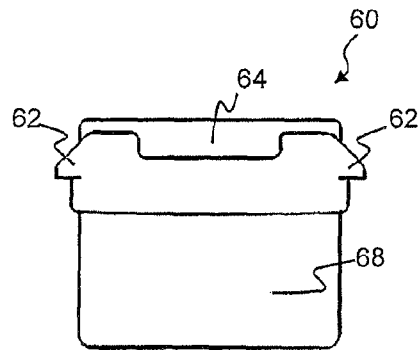
FIG.5A　　　　　　　FIG.5B
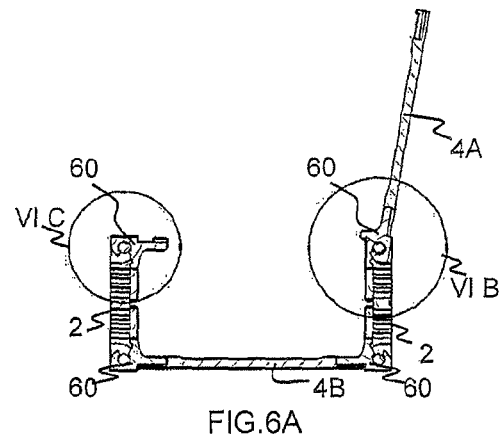
FIG.6A
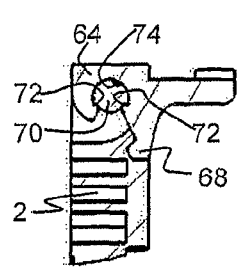
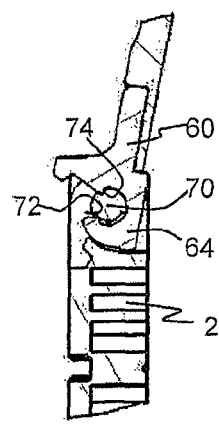
FIG.6C　　　　　　　FIG.6B

ENERGY GUIDE CHAIN WITH DEFORMABLE JOINT ELEMENTS

The invention relates in general to an energy guide chain for guiding cables, hoses, or the like. In particular, the invention relates to such an energy guide chain having a plurality of links, which form two parallel link strands that are connected by separate transverse webs. In this case, the links can be angled to one another by means of articulated connection.

Such an energy guide chain is known, for example, from German patent DE 35 31 066 of the applicant. In cable carrier chains according to the principle of DE 35 31 066, the articulated connection between adjacent links is formed by pivot bolts or pivot pins arranged at half height of the link and corresponding recesses. Although such cable carrier chains have proven themselves very well, they have the disadvantage that the articulated connection comprising pivot pins and corresponding mounting is unavoidably subject to a certain wear as a result of friction in spite of a long service life. This wear can result in a certain abrasion, for example, which generally and in particular in the case of production under clean room conditions or in the case of food production is undesirable.

A refinement for reducing the wear and abrasion in energy guide chains is known from international patent application WO 02/086349. In this case, the articulated connection between adjacent links is formed by joint elements which are elastically deformable in the angling direction of the chain links. In the case of the very low-wear energy guide chain according to WO 02/086349, in contrast, the links in both strands are mirror-symmetrical with respect to the longitudinally-oriented main plane of the energy guide chain, i.e., the links of one strand are mirrored to those of the other strand and therefore different. These mirror-symmetrical chain links therefore require different injection molds for production.

It has now been shown, in spite of many advantages and the successful dissemination of energy guide chains according to WO 02/086349, that the different shape can have the result in unfavorable cases that as a result of manufacturing tolerances in both chain strands, different angle delimitations, different play, and in particular different lengths of the strand may arise. This is obviously undesirable, in particular in the case of comparatively long chains.

An energy guide chain is known from published application DE 10 2007 061 296, which, to reduce the number of components, uses modules embodied as regionally mirror-symmetrical, which are composed of a plurality of external links, and internal links which are embodied as mirror-symmetrical. The proposed connection of the integrally produced modules in the chain longitudinal direction is disadvantageous in this case. Specifically, the latter results in different shapes at the ends of the left and right link strands both on the stationary chain end and also on the moving chain end. The problem of different ends of the link strands is still more pronounced in the case of an energy guide chain according to published application DE 10 2008 020 907. It is proposed therein that the entire chain only be constructed from a single comb-like module having external links, transverse webs, and internal links. The interleaving, which is offset to one another, of these comb-like modules has the result, however, that the ends to be fastened are not only shaped differently, but rather are also offset different distances in the longitudinal direction.

Proceeding from the above-mentioned prior art, the invention is therefore based, as a first technical problem, on proposing an energy guide chain having the advantages of a low-wear articulated connection, which additionally reliably avoids tolerance-related differences between the opposing chain strands or link strands, in particular length differences.

In the case of an energy guide chain of this type according to the preamble of claim 1, this first object is achieved according to the invention in that different internal links and external links respectively alternate in each link strand in the longitudinal direction. In this case, both the internal links and also the external links are respectively designed as mirror-symmetrical with respect to their vertical center plane extending perpendicularly to the longitudinal direction. Thus, structurally identical internal links and structurally identical external links can be used in both link strands, which are each produced in the same mold, considered per se. The links of one type, which are produced in a mold, in particular an injection mold, are therefore used in both link strands. As a result, possible tolerances in both strands have identical and symmetrical effects, so that in particular length differences can no longer arise. Furthermore, the solution provides forming the articulated connection between adjacent links by way of a mirror-symmetrical joint element, which in particular has opposing end regions, which are implemented as mirror-symmetrical with respect to the vertical center plane. These end regions are used for fastening or securing respective adjacent internal and external links in the longitudinal direction of the chain. In that the connection of adjacent links in the longitudinal direction is also designed as continuously mirror-symmetrical to the vertical center plane, strands are achieved which are mirror-symmetrical overall with respect to the longitudinally-oriented main plane of the energy guide chain. Therefore, both strands on the left and right, both on the stationary chain end and also on the moving chain end, respectively have identical termini for the fastening. In this way, inter alia, the fastening is simplified and the number of required fastening parts is reduced to only one component shape.

The joint element is preferably arranged in the longitudinal center plane of the links extending in the longitudinal direction. This allows, with suitable design, to also use the links rotated about their transverse axis. In such a preferred embodiment, the internal link and the external link differ in their outline in a side view, so that a different curve shape of the chain is possible depending on the arrangement. In particular, internal and external links differ at least by way of the differing design of their opposing end faces in the longitudinal direction. These end faces form stop faces in the case of at least one of the two different link types, which are used to delimit both the end location having greatest angling and also the end location having least angling. For the different delimitation, these stop faces are asymmetrical with respect to the longitudinal center plane of the link. By way of the arrangement of the stop faces on the end faces of at least one link type, a stable arrangement is ensured by the greatest possible overlap between internal and external links. In addition, the asymmetrical design in relation to the chain longitudinal plane allows the deflection direction of the chain to be adapted by turning over the asymmetrical link about the transverse axis if desired.

In a preferred embodiment, the link of the second link type has stop faces, which interact with the asymmetrical stop faces on the end faces of the first link and are asymmetrical to a lesser extent with respect to the longitudinal center plane. A lesser asymmetry, in comparison to the stop faces of the first link, also allows, by turning over the second link about the transverse axis, an additional, but more finely tunable setting of the pivot movement or the pre-tension to be achieved.

In a preferred embodiment, internal links and external links each have thickened middle regions adjoining one another in the longitudinal direction, and respective thinner overlap regions adjoining thereon frontally. These overlap regions overlap the internal and external links in the longitudinal direction. The stop faces on the end faces of the first link interact with corresponding stop faces on the thickened middle region of the second link. Furthermore, preferably additional third and fourth stop faces on the end faces of the second link interact with corresponding stop faces on the middle region of the first link. Through corresponding doubling of the stop faces in the inner region and in the outer region of the links, the stability of the chain is increased in both stop positions.

It has proven to be advantageous if the stop faces on the end faces of the first link are curved, in particular concavely curved. It is accordingly advantageous if the interacting stop faces of the second link are implemented as congruently curved, i.e., in particular convexly congruently curved. A soft, nestling stop is achieved in this case in that the stop faces on the end faces of the first link and also the interacting stop faces on the end faces of the second link are respectively curved with identical curvature, for example, according to a rolling curve. In the embodiment having additional third and fourth stop faces, these are also preferably congruently curved in pairs, but with stronger or more sharply pronounced curvature than the curved stop faces on the end faces of the first link. The curvatures of the stop faces are preferably selected according to a curve shape which not only avoids a flat stop, but rather additionally allows successive nestling or snuggling for increased stability in the stop.

For fastening the transverse webs, it has proven to be advantageous if internal link or external link or both respectively have a central opening on their top and bottom narrow sides, in which a holding shaft is provided, which extends in the longitudinal direction of the chain. This allows a pivotable, hinge-type fastening of the transverse web on the corresponding link, for example, by means of a hinge on the transverse web provided for this purpose. In this case, each transverse web is fastened pivotably on the corresponding holding shaft on at least one side, but preferably fastened pivotably on opposing holding shafts on both sides. The interfering inward projection of known catch lugs is avoided by the use of such bearing bolts or holding shafts.

Preferably, for the pivotable fastening of conventional, already available transverse webs, a pivot horn is provided as a separate component as an adapter. Corresponding separate pivot horns form a further aspect of the invention independent of the above problem solution. In a preferred embodiment, such a pivot horn has a hinge-type handle on one side for the pivotable mounting on the holding shaft and, on the other side, a fastening matching with the transverse webs, for example, two opposing catch projections in the longitudinal direction of the chain for fastening by means of snap closure on the transverse web. This embodiment additionally prevents pivoting upward during opening of the snap closure and, on the other hand, opening of the snap closure during pivoting upward.

In the case of the use of such pivot horns, it is advantageous to provide catch means on the holding shaft, which interact with the pivot horn to latch in the folded-open position or in the folded-closed position or preferably in both positions.

In a preferred embodiment, which is independent of the above-mentioned aspects, each joint element comprises at least one first snap means, which interacts with corresponding second snap means on one of the two link types. The first and the second snap means form a snap connection in this case for holding the respective one link type on the other link type in the direction transverse to the longitudinal direction of the chain.

In this preferred embodiment having snap connection, it is advantageous for material savings if only every second link is connected to both link strands by means of an upper transverse web and a lower transverse web. The other links, which lie in between, can be held by said snap connection on the links connected by means of transverse webs. In a particularly simple embodiment, the joint elements are embodied as separate components, which respectively connect three links, in particular two links without transverse webs and one interposed link with transverse web. Alternatively, the joint elements can also be molded-on protruding frontally on one of the two link types, in particular by formfitting or materially-bonded extrusion. In the case of joint elements embodied as separate components, it is preferable if each joint element has a maximum width which substantially corresponds to the maximum width of both link types, but does not exceed it. In this way, the maximum possible width without excess is utilized. In addition, the joint element can have a taper in a middle region. The joint element can be held in the holding direction of the above-mentioned snap connection on the middle of the three links in this taper.

According to a further independent aspect, it is advantageous if the joint element has damping projections, which can extend with one free end for damping between interacting stop faces of the links. So as not to impair the nestling or stopping of the interacting stop faces, a recess for partially or entirely accommodating the damping projection can be provided on one of the two link types.

Finally, it is expedient if the link having the greater asymmetry in lateral outline is provided as the external link and the link having lesser asymmetry is provided as the internal link.

Further details, advantages, and features of the invention may be inferred from the following part of the description, in which an exemplary embodiment is explained in greater detail on the basis of the appended drawings. In the figures FIG. 1: shows a perspective partial view of the energy guide chain according to the invention;

FIG. 2: show various views according to normal projection of an internal link of the energy guide chain according to FIG. 1;

FIG. 3: shows various views according to normal projection of an external link of the energy guide chain according to FIG. 1;

FIG. 4: shows a side view and a top view of a joint element according to the invention according to an additional aspect of the invention;

FIG. 5: shows a front view and a side view of a pivot horn for the pivotable fastening of the transverse webs according to a further aspect of the invention;

FIG. 6: shows a cross-section through the energy guide chain having pivot horn according to FIG. 5 with pivoted-up upper transverse web;

FIG. 1 shows a perspective illustration of a subregion of an energy guide chain according to the invention, designated in general with 1. The energy guide chain 1 consists of a plurality of chain links 2, 3 which are articulated with one another. The chain links 2, 3 are assembled to form to parallel link strands, which are detachably connected by upper and lower transverse webs 4a, 4b. The energy guide chain 1 forms a cavity, which is used as a guide channel for cables or hoses, for example, between the link strands 2, 3 and the transverse webs 4a, 4b. By way of the set of individual parts consisting of two parallel opposing links 2, 3 and two associated transverse webs 4a, 4b, dimensionally stable chain elements having twisting and torsional stiffness are formed as the smallest repeating chain unit. The energy guide chain 1 shown can be deformed in an arc to form a lower belt, a deflection region, and an upper belt, for example, in order to connect two machine parts which are movable relative to one another using power and/or data lines.

As is apparent from FIG. 1, respective differently designed internal links 2 alternate with external links 3 in each link strand in the longitudinal direction of the chain 1. In both link strands, however, the same internal links 2 and the same external links 3 are used. As is apparent in greater detail from FIG. 2 and FIG. 3, each internal link 2 and each external link 3, considered per se, is respectively implemented as mirror-symmetrical with respect to its vertical center plane S1, which extends perpendicularly to the longitudinal direction or neutral fibers of the energy guide chain 1. Correspondingly, by 180° rotation about the vertical axis, both the internal link 2 and also the external link 3 can respectively be used in the left link strand or in the right link strand, as shown in FIG. 1.

Furthermore, as shown in FIG. 1, the articulated connections between the alternating internal and external links 2, 3 are formed by a joint element 5. As shown in FIG. 1, the joint elements 5 preferably extend substantially over the entire width of the links 2, 3 and terminate flush on the inside and outside at the lateral faces thereof.

The joint element 5 is a plate-like and preferably separate component which is elongated in the longitudinal direction of the energy guide chain 1. The corresponding joint element 5 is shown in greater detail in FIG. 4. Corresponding to the links 2, 3, the joint element 5 is also implemented as mirror-symmetrical with respect to the vertical center plane S1. It comprises a middle region 51 and opposing end regions 52. In the exemplary embodiment shown, the joint element 5 respectively connects precisely three links 2, 3 to one another, respectively two external links 3 with an interposed internal link 2 here. For fastening on the internal link 2, the joint element 5 has two transverse extended thickened areas 53 in the middle region 51. The thickened areas 53, which are used for securing or fastening the internal link 2 in the longitudinal direction of the chain 1, are approximately cylindrical. Furthermore, the joint element 5 has in its middle region 51, as is best apparent from FIG. 4b, an opening 54. The opening is only open toward one side and is delimited in the longitudinal direction by the thickened areas 53. The joint element engages in a formfitting manner with the opening 54 in the middle region of the internal link 2. In this way, additional fastening in the longitudinal direction is achieved and at the same time securing in the direction transverse to the longitudinal direction, preferably against displacement outward, is ensured because of a web 55 delimiting the opening 54 on one side. For the connection to the two external links 3, the opposing end regions 52 of the joint element 5 are designed as transversely lying thickened areas which are approximately semicylindrical. Snap means, in particular snap hooks 56, are provided in the end regions 52. The snap hooks 56 are formed by notches transverse to the longitudinal direction, of approximately equal depth as the opening 54, in the thickened end regions 52. Protrusions 57 molded integrally with the joint element 5 are provided on the side of the end regions opposite to the barbs of the snap hooks 56. The protrusions 57 are used for engagement without play of the snap hooks 56, i.e., the joint element 5 on the external links 3 and vice versa.

According to FIG. 4, the joint elements 5, more precisely their plate-type body, are embodied with a substantially lesser material thickness with respect to amount than the amount of their width and length. Produced from suitable plastic, the joint elements 5 therefore act like a flexible hinge band or a leaf spring. Therefore, the joint elements 5, after bending in the angling position, exert elastic restoring forces on the adjacent links 2, 3, so that the chain 1 tends to be reset into its starting position. The joint element 5 can also be embodied such that substantially no or only very small restoring forces are generated. For this purpose, a type of thin film hinge can be provided in the middle between one end region 52 and the middle region 51, so that the joint element is only used for longitudinal securing.

The joint element 5 is therefore integrally molded from a plastic suitable for elastic deformation (in the plane of FIG. 4a), on the one hand, and for forming the snap hooks 56, on the other hand. For this purpose, preferably a plastic better suitable in comparison to the harder material of the links 2, 3 is selected. The head-shaped end regions 52 together with the thickened areas 53 and the opening 54 in the middle region ensure a high strength of the connection between joint element and links 2, 3 in the traction direction.

Figure 4A:
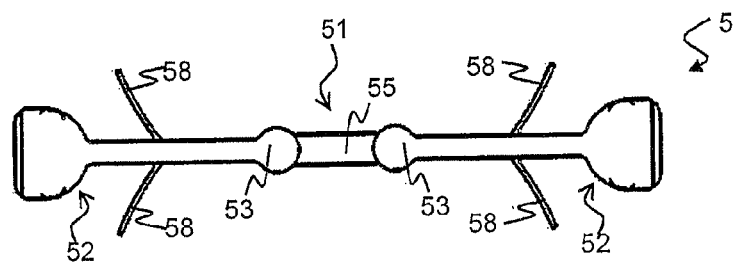
Figure 4B:
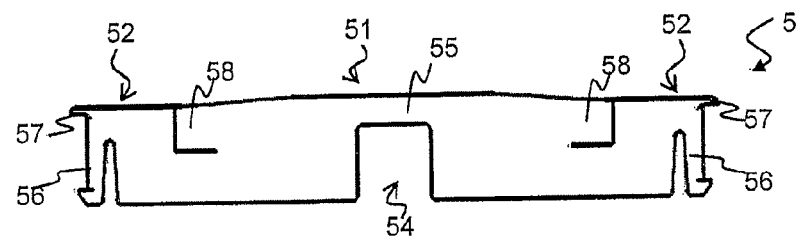

Furthermore, as is best apparent from FIG. 4a, each joint element 5 is provided with damping projections 58 arranged mirror-symmetrically. The damping projections 58 are implemented like leaf springs, i.e., having substantially lesser thickness than their width and length. The damping projections 58 are integrally molded onto the joint element 5 or produced therewith, so that they respectively protrude in a wing shape at an angle in the range between 30° and 90° to the longitudinal axis of the joint element 5. The damping projections 58 can have a shaping different than the arc shape shown in FIG. 4a. For example, they may be embodied as corrugated, zigzagging, or with thickened areas on their ends. The width of the damping projections 58 in the direction transverse to the longitudinal direction of the energy guide chain 1 is less than the width of the joint element 5. The projections 58 are arranged symmetrically to the longitudinal center plane S1 (see FIG. 2a) and also symmetrically to the vertical center plane S2 (see FIG. 2a). The damping projections 58 are freestanding and have a (curve) length between their free end and the base on the body of the joint element 5 which is between 5% and 25% of the height of the links 2, 3 in the vertical center plane. The damping projections 58 are used for the purpose of protruding with their free end into the region between two interacting stop faces of adjacent internal and external links 2, 3, to damp the stop and therefore reduce the noise development. The damping projections 58, however, in comparison to the body of the joint element 5, cause essentially no restoring force. The above-mentioned features of the joint element are fundamentally independent of the design according to the invention of the link strands according to the following description and can also advantageously be used in other chains.

FIGS. 2a-2e show a first type of the alternating link types of the chain 1 from FIG. 1, more precisely one internal link 2. In this case, the internal link 2 is understood as the link which also faces toward the guide channel 3, which is formed by the chain strands arranged in parallel and transverse webs 4a, 4b, in the region of the overlap with the respective adjacent link. The internal link 2 has a base plate 21 substantially in the form of a butterfly, which is implemented as mirror-symmetrical to its vertical center plane S1 extending perpendicularly to the longitudinal direction. A middle region 22 of the internal link 2 is implemented as thicker in comparison to the base plate 21, as is most apparent from the perspective view in FIG. 2e. This thickened middle region 22 respectively forms a pair of first mirror-symmetrical stop faces 23 and a pair of second mirror-symmetrical stop faces 24. The first and second stop faces 23, 24 are mirror-symmetrical to the vertical center plane S1. Furthermore, the first stop faces 23 can be designed to be mirror-symmetrical to the second stop faces 24 with respect to the longitudinal center plane S2. However, preferably the first and second stop faces 23, 24 are slightly asymmetrical with respect to the longitudinal center plane S2. Due to corresponding slight asymmetry, by 180° rotation about the transverse axis (intersection line between the center planes S1 and S2), another delimitation of the angling can be set, in particular, setting of the pre-tension can also be performed. To differentiate the selected setting, a corresponding marking 25 is provided on the outside of the internal link 2.

To accommodate and fasten the joint element 5, frontally oriented recesses 26 are provided in the internal link 2. The recesses 26 are central and are mirror-symmetrical to both the vertical center plane S1 and also to the longitudinal center plane S2. The end region toward the middle of each recess 26 is implemented for the formfitting engagement of the thickened areas 53 of the joint element 5. The frontal region of each recess 26, in contrast, opens with increasing distance from the end region and allows the desired bending of the joint element 5. A central longitudinal opening 26A on the inside, best visible from FIG. 2B, is used to accommodate the middle web 55 of the joint element. The joint element is therefore inserted from the inside of the internal link 2 into the inwardly open recesses 26 and longitudinal openings 26A.

Frontally, the internal link 2 has one pair of first protrusions 27 and one second pair of second protrusions 28, which each protrude transversely outward. The protrusions 27, 28 are also integrally formed with the base plate 21. The arrangement of the first and second protrusions 27, 28 corresponds with respect to symmetries similarly to those of the first and second stop faces 23, 24. Furthermore, web-shaped auxiliary stops 29 are provided, which delimit the recesses 26 in the direction parallel to the plane S1.

FIGS. 3a-3e show an external link 3 as a complementary link type of the chain from FIG. 1. The external link 3 has a substantially planar base plate 31 and a middle region 32, which is thickened in relation to the base plate 31. The base plate 31 determines the outline in a side view, which substantially differs from the symmetrical outline of the base plate 21 of the internal link 2. The outline of the external link 3 has approximately the shape of an equilateral symmetrical trapezoid, having substantially linear upper and lower narrow sides or base sides parallel to the longitudinal direction, but having curved legs.

The external link 3 according to FIGS. 3a-3e has, to delimit the position having least angling, a pair of first opposing stop faces 33. Free standing of the chain 1 is thus ensured, inter alia, by the first stop faces 33. The stop faces 33 are implemented by the end faces of the external link 3 and are embodied as mirror-symmetrical with respect to the vertical center plane S1. The external link 3 has, furthermore, a pair of second stop faces 34, which are also embodied as opposing and mirror-symmetrical with respect to the vertical center plane S1. The second stop faces 34 are used to delimit the relative position of two adjacent links 2, 3 having the greatest possible angling. As is most apparent from FIG. 3a and FIG. 3c, the first stop faces 33 and the second stop faces 34 are not mirror-symmetrical with respect to the longitudinal center plane S2, however, but rather significantly asymmetrical thereto. The second stop faces 34 are offset toward the middle with respect to the first stop faces and slightly rotated approximately about the transverse axis (intersection line between planes S1 and S2). Depending on the rotational position of the external link 3 about the transverse axis, the first stop faces 33 of the external link 3 stop either on the first stop faces 23 of the internal link 2 or on the second stop faces 24 of the internal link 2. This correspondingly applies similarly vice versa for the second stop faces 34 of the external link 3. Therefore, by arranging the external link 3 having the shorter narrow side on the bottom as shown in FIG. 3 or, rotated by 180°, with the shorter narrow side on top, the deflection direction of the cable guiding chain 1 can be changed. Variable arrangements are also possible in the longitudinal direction, so that chains, using which corrugated, zigzagged, inter alia, curved shape are settable, depending on the application, are possible. This correspondingly applies similarly for the setting of a pre-tension by arranging the internal link 2, having the only slightly asymmetrical first and second stop faces 23, 24. Thus, not only the dynamic curve profile of the cable guiding chain 1 is set by suitably rotated arrangement of the internal and external links 2, 3, but rather also fine setting is possible. Setting can also be performed in a finely tuned manner with respect to the idle freestanding position of the cable guiding chain 1, i.e., depending on the application, linear, pre-tensioned, or sagging.

Furthermore, FIGS. 3a-3e show a pair of opposing longitudinally-oriented recesses 36, which accommodate the head-shaped end regions 52 of the joint element 5 in a formfitting manner as shown in FIG. 1. The recesses 36 are shaped mirror-symmetrically with respect to both planes S1 and S2. In the end region 36A facing toward the middle, the recesses 36 are respectively adapted in longitudinal section to the longitudinal section of the end regions 52 of the joint element 5. For the interaction with the respective snap hook 56, a snap-in edge or snap step 36B is provided in the end region toward the outside, which the snap hook 56 of the engaging end region 52 engages behind. The joint element 5 is secured on the external link 3 in the transverse direction and vice versa by snap step 36B and snap hook 56. Because the external links 3 are secured on the internal links 2 in the transverse direction by means of a snap connection 56, 36B, omitting transverse webs 4a, 4b is made possible. In fact, as is apparent from FIG. 1, transverse webs 4a, 4b on external links 3 are superfluous, so that these transverse webs are only still provided on the internal links 3 in a way which saves costs and weight. Alternatively, the transverse webs can also only be provided on the external links.

The recesses 36 are further provided with auxiliary stops 39, which are stepped in longitudinal section, and which are asymmetrically arranged corresponding to the first and second stop faces 33, 34. The auxiliary stops 39 interact with the frontal auxiliary stops 29 on the recesses of the internal link 2. The web-shaped auxiliary stops 29 are used in particular for delimiting a relative displacement between the connected links 2, 3 in the vertical direction parallel to the plane S2, i.e., perpendicularly to the longitudinal direction, in the stretched position of the chain 1. For this purpose, the auxiliary stops 29 interact with the upper and lower delimiting faces of the recesses 36, which form the auxiliary stops 29. To delimit the displacement perpendicularly at maximum angle position, additional further auxiliary stops 39A are provided mirror-symmetrically on the external link. The further auxiliary stops 39A are arranged for this purpose such that the corresponding narrow sides of the internal link 2 can stop thereon.

In the overlap region of the external link 3, with which it laterally opposes the internal link 2 in an overlapping manner, a pair of first recesses 37 and a pair of second recesses 38 are provided. The recesses 37, 38 are open toward the inner side approximately in a sector shape between the first or second stop faces 33, 34, respectively, and the thickened middle region 32. The first recesses 37 and also the second recesses 38 are respectively mirror-symmetrical in pairs to the vertical center plane S1. When the strand is assembled, respectively the first protrusions 27 or the second protrusions 28 engage in the recesses 37, 38. The height of the free cross-section of the recesses 37, 38 preferably decreases toward the stop faces 33, 34 up to the amount of the corresponding height of the protrusions 27, 28, whereby the deflection arc of the chain 1 is stabilized. The displacement perpendicularly to the longitudinal direction of the chain is also limited by the recesses 37, 38 and the protrusions 27, 28 engaging therein, together with the auxiliary stops 29, 39A.

FIG. 3c shows further pairs of third and fourth stop faces 37A, 38A, which respectively delimit the recesses 37, 38 toward the vertical center plane S1. As is apparent in particular from comparison of the top view and isometry according to FIG. 3d or FIG. 3e with the rear view according to FIG. 3c, the third and fourth stop faces 37A, 38A are respectively frontally formed by the thickened middle region 32. For reinforcement between the stop faces 37A, 38A, the middle region 32 has a type of rib framework having a plurality of longitudinal ribs and one central perpendicular rib, as shown in FIG. 3c.

The third stop faces 37A are also mirror-symmetrical to the vertical center plane S1, but offset toward the middle of the external link 3, with respect to the first stop faces 33. This correspondingly applies similarly for the fourth stop faces 38A with respect to the second stop faces 34. To the same extent as the first and second stop faces 33, 34, the third and fourth stop faces 37A, 38A are also asymmetrical to the longitudinal center plane S2. The third and fourth stop faces 37A, 38A interact with third and fourth stop faces 27A, 28A on the end faces of the internal link 2 in the region of the protrusions 27, 28. The third and fourth stop faces 27A, 28A; 37A, 38A therefore also delimit—depending on the orientation with respect to the transverse axis—either the greatest possible or the least angling between adjacent links 2, 3.

In the end region of the third and fourth stop faces 37A, 38A toward the longitudinal center plane S2, planar openings (not shown in greater detail) having lesser depth can be provided, which can preferably entirely accommodate the thickness of the damping projections 58 of the joint elements 5. In this way, impairment of the interaction of the curved stop faces 37A, 38A or 27A, 28A, respectively, is avoided without loss of the desired auxiliary damping.

As may be seen from the comparison of FIG. 2a with FIG. 3c, the extensions 27, 28 of the internal link 2 form pairs of fifth and sixth stop faces 27B, 28B which interact—to further enlarge the overall stop face dimensions—with corresponding fifth and sixth stop faces 37B, 38B of the external link 3. The fifth and sixth stop faces 27B, 28B of the internal link 2 face toward the center plane S1. The fifth and sixth stop faces 37B, 38B of the external link 3 delimit the recesses 37 or 38, respectively, opposite to the third and fourth stop faces 37A, 38A. The middle regions 22, 32, the projections 27, 28, and the recesses 37, 38 are designed and arranged such that in the stop position of the second stop faces 34 of the external link 3 on the second stop faces 24 of the internal link 2, the respective fourth stop faces 28A, 38A and also the respective fifth stop faces 27B, 37B are also stopped in contact. Similarly, the design is such that in the stop position of the first stop faces 33 of the external link 3 on the first stop faces 23 of the internal link 2, the respective third stop faces 27A, 37A and also the respective sixth stop faces 28B, 38B are also stopped in contact. Overall, a high stability in the respective stop is thus ensured.

Furthermore, as is apparent from FIGS. 2a-2e and FIGS. 3a-3e, the first and second stop faces 23, 24 of the internal link and the corresponding interacting first and second stop faces 33, 34 of the external link are implemented as curved. To allow a rotation of the external link 3 by 180°, without impairing the stability in the stop, the curvature of the stop faces 23, 24; 33, 34 is preferably identical in this case. Preferably, identical curvatures are provided, which are not circularly cylindrical, but rather allow successive nestling of the curved stop faces 23, 24; 33, 34. For example, curvature according to a suitable rolling curve or a cycloid can be expedient. The third and fourth stop faces 37A, 38A of the external link 3 and the third and fourth stop faces 27A, 28A of the internal link 2 are also identically curved correspondingly similarly, also identically curved, but with more sharply pronounced curvature. By curved stops, on the one hand, a more stable configuration with less play can be achieved in the stop. In particular, the noise development is also reduced, because flat stopping in the actual meaning is avoided. In addition, a type of centering action can be achieved in the main planes of the links 2, 3. The fifth and sixth stop faces 27B, 28B; 37A, 27B can be linear or planar, as in FIG. 2a or FIG. 3c, respectively, or can also be designed with suitable curvature, similarly to the above-mentioned stop faces 23, 24; 33, 34 or 27A, 28A; 37A, 38A.

The features described hereafter of a pivot horn as a separate connection element for the transverse webs 4a, 4b are fundamentally independent of the design according to the invention of the link strands, and can also be used advantageously in other chains.

FIGS. 5a-5b show a pivot horn 60 embodied as a separate component, which is used for the one-sided fastening of a transverse web 4a, 4b on the desired link 2, 3.

The pivot horn 60 has, in the inward facing end region, a conventionally designed connector having catch protrusions 62. These protrude in the longitudinal direction (with respect to the chain 1), i.e., transversely to the center axis of an attached transverse web 4a, 4b, and are arranged symmetrically, as is apparent from FIG. 5b. The connector for the transverse webs 4a, 4b is of a known construction, for example, according to patent specification DE 53 31 066 of the applicant, and is therefore used for latching conventionally embodied transverse webs 4a, 4b.

In contrast, in the outwardly facing region, the pivot horn 60 has a hinge-type claw 64, which extends in the longitudinal direction, i.e., parallel to the protrusion of the catch protrusions 62. The claw 64 is used for the latching, but pivotable fastening on a link. For the catch connection, the claw 64 has inwardly directed axially extending catch lugs or catch hooks 66.

A bearing pin or holding shaft 70 for the catch connection with the claw 64 of the pivot horn 60 and the transverse web 4a, 4b connected thereto is respectively provided in an opening in the upper and lower narrow sides of the internal link 2, as shown in FIGS. 2a-2e, for example. Two holding shafts 70 are respectively arranged symmetrically to the longitudinal center plane S2, whereby upper and lower transverse webs can be pivotably fastened by means of corresponding pivot horns according to FIG. 5, as shown in FIG. 1. Alternatively or additionally, corresponding holding shafts 70 could also be arranged in the external links. The holding shafts 70 are provided in the central recesses in the middle region 22 and extend in the longitudinal direction. Furthermore, as is obvious from FIG. 2d in particular, the holding shafts 70 are respectively provided between the inside and outside of the internal link, preferably centrally. Accordingly, conventional molded-on catch lugs do not protrude inward from the links 2, 3, so that when the pivot horns are disengaged, the channel in the chain 1 is easily accessible and lines do not catch as they are led in and out.

Preferably, the holding shafts 70 are provided with catch means shown in greater detail in FIGS. 6a-c, which interact with the pivot horn to catch in the folded-open position (see FIG. 6a) and in a folded-closed position (see FIG. 6b). As is best apparent from FIGS. 6b-6c, the holding shafts 70 are provided in cross-section over a specific arc with a step or opening facing toward the link center. The latter forms axially extended edges 72. The two catch lugs 66 of the pivot horn 60 engage behind these edges 72 in the closed position according to FIG. 6C. As is best apparent from FIG. 6B, each holding shaft 70 also has an additional axial catch notch 74, which faces upward or downward, respectively, in which the inner catch hook 66 engages to latch the transverse web 4a, 4b in the open, i.e., pivoted-open position, according to FIG. 6a. Furthermore, FIG. 5a also shows the additional stop 68 on the pivot horn 60. In the closed position, best apparent from FIG. 6c, the additional stop 68 presses in a formfitting manner against a corresponding counter stop in the region of the inward facing upper or lower edge of the middle region 22 of the link 2. The openings in the link 2, which expose the holding shafts 70, are respectively dimensioned such that the pivot horn 60 is pivotable about the holding shafts 70. The middle region 22 is shaped rising like a ramp inward and upward or downward on its upper or lower edge, respectively, as shown in FIG. 6B, so that also a corner of the pivot horn 60 is additionally held thereon in the pivoted-open position.

The above-described pivot horn 60 is therefore used as an adapter for the pivotable fastening of conventional transverse webs 4a, 4b, which are not designed as pivotable per se, on the chain links 2, 3. Holding shafts 70 which are compatible with the pivot horn 60 can also be provided differently than the above-described links 2, 3.

In practice, in addition to the vertical mirror symmetry of the components, the proposed curvature of the interacting stop faces 23, 33 or 24, 34, etc., respectively, as is recognizable, for example, from FIG. 2A and FIG. 3A or FIG. 2B and FIG. 3B, has proven to be particularly advantageous. The successive nestling thus achieved from the inside (i.e., from the side of the joint elements 5), to the outside, allows by way of slight material-dependent elastic deformation of the links 2, 3, mutual adaptation of the links 2, 3 and therefore the compensation of production-related tolerances. The snuggling of the curved stop faces 23, 33 or 24, 34, etc., respectively, continues progressively until the contact over the entire area is achieved as much as possible in the stop. The suitable curve shape of the desired continuous or steady and strictly monotonous curvature can be empirically ascertained by experiments. The curve shape is in particular to be selected as a function of the selected material of the individual links 2, 3 and in particular of the joint element 5, since these are dependent, inter alia, on the elasticity and the joint kinematics.

LIST OF REFERENCE NUMERALS

1 energy guide chain
2 internal link
3 external link
4a transverse web
4b transverse web
5 joint element
21 base plate
22 middle region
23 first stop face
24 second stop face
25 marking
26 recess
26 longitudinal opening
27 first protrusions
28 second protrusions
27A third stop face
28A fourth stop face
27B fifth stop face
28B sixth stop face
29 auxiliary stops
31 base plate
32 middle region
33 first stop face
34 second stop face
36 recess
36A recess end region
36B catch step
37 first protrusions
38 second protrusions
37A third stop face
38A fourth stop face
37B fifth stop face
38B sixth stop face
39 auxiliary stop
39A further auxiliary stop
51 middle region
52 end region
53 thickened area
54 opening
55 web
56 snap hook
57 protrusions
58 damping projections
60 pivot horn
62 catch protrusions
64 hinge claw
66 catch hook
68 additional stop
70 holding shaft
72 edges
74 catch notch
S1 vertical center plane
S2 longitudinal center plane

What is claimed is:

1. An energy guide chain comprising:
a plurality of links articulable with one another which form two parallel link strands,
a plurality of transverse webs, wherein the two parallel link strands are detachably connected by the transverse webs,
wherein adjacent links of the plurality of links of each link strand are angleable to one another by an articulable connection,
wherein the articulable connection between the adjacent links comprises at least one joint element, wherein the at least one joint element is elastically deformable such that the adjacent links are angleable to one another in an angling direction,
wherein, in each link strand, two adjacent links comprise an internal link and an external link, wherein internal links and external links alternate in a longitudinal direction of the chain and wherein the internal links are different from the external links,
wherein the internal links and the external links are mirror-symmetrical to a vertical center plane extending perpendicularly to the longitudinal direction,
wherein, the internal links and the external links are usable in both link strands, and the adjacent internal and external links are detachably connected by the at least one joint element,
wherein the at least one joint element which connects the adjacent internal and external links is molded-on at least one of the adjacent internal and external links or is a separate component having opposing end regions which connect the adjacent internal and external links in the longitudinal direction of the chain, wherein the end regions are mirror-symmetrical with respect to the vertical center plane.

2. The energy guide chain according to claim 1, wherein: the internal links and the external links have curved stop faces to delimit an end location with least angling between the adjacent links and/or curved stop faces to delimit an end location with greatest angling between the adjacent links.

3. The energy guide chain according to claim 1, wherein: the internal links and the external links each have opposing end faces,
wherein the opposing end faces of the internal links differ from the opposing end faces of the external links,
wherein the opposing end faces of at least a first link of a pair of links composed of the internal and external links each comprise first and second stop faces, wherein the first and second stop faces are asymmetrical with respect to a longitudinal center plane of the first link, wherein the first stop faces of the first link delimit an end location with least angling between the adjacent internal and external links and the second stop faces of the first link delimit an end location with greatest angling between the adjacent internal and external links.

4. The energy guide chain according to claim 2, wherein: a curvature of the curved stop faces of the internal and external links allows successive nestling of the stop faces of the internal and external links.

5. The energy guide chain according to claim 1, wherein: the at least one joint element of the articulable connection between the adjacent links comprises on each end region at least one first snap means, which interacts with a corresponding second snap means of a first link of a pair of links composed of the internal and external links, wherein first and second snap means form a snap connection to hold the first link on the second link of the pair of links transversely to the longitudinal direction.

6. The energy guide chain according to claim 5, wherein: only every second link of each link strand is detachably connected by the transverse webs, and
wherein the first links are held by the snap connection to the joint element transversely to the longitudinal direction on the links connected by the transverse webs.

7. The energy guide chain according to claim 6, wherein: the joint element connects three links, in particular two first links with a second link interposed between the two first links.

8. The energy guide chain according to claim 7, wherein: the joint element has a maximum width, which at most corresponds to a maximum width of the first and second links, and
wherein the joint element has an opening in a middle region, used to hold the joint element in the holding direction of the snap connection in the middle of the three links.

9. The energy guide chain according to claim 1, wherein: the joint element has at least one damping extension with a free end for damping between interacting stop faces of the links.

10. The energy guide chain according to claim 1, wherein: the internal links and/or external links each have an upper side and a lower side,
wherein at least one of the internal links and external links have a central opening on their upper and lower narrow sides which contains a holding shaft extending in the longitudinal direction,
for the pivotable hinge-type fastening of a transverse web at least on one side pivotably on the corresponding holding shaft,
wherein a pivot horn is fastened as a separate component at least on one side of each transverse web,
wherein the pivot horn comprises a hinge-type claw for the pivotable mounting on the holding shaft and catch means for the latching fastening on the transverse web.

11. The energy guide chain according to claim 10, wherein: the holding shaft has a catch means which interacts with the pivot horn.

12. The energy guide chain according to claim 1, wherein: the at least one joint element is arranged in a longitudinal center plane of the links extending in the longitudinal direction of the chain.

13. The energy guide chain according to claim 3, wherein: a second link of the pair of internal and external links each comprise opposing first stop faces and opposing second stop faces,
wherein the opposing first stop faces of the second link interact with the first stop faces of the opposing end faces of the first link,
wherein the opposing second stop faces of the second link interact with the second stop faces of the opposing end faces of the first link, and
wherein the first and second stop faces of the second link are asymmetrical with respect to a longitudinal center plane of the second link.

14. The energy guide chain according to claim 13, wherein: the first and second stop faces of the opposing end faces of the first link are identically curved, and
wherein the opposing first and second stop faces of the second link are congruently curved.

15. The energy guide chain according to claim 14, wherein: the first and second stop faces of the opposing end faces of the first link are concavely curved, and
wherein the opposing first and second stop faces of the second link are congruently convexly curved.

16. The energy guide chain according to claim 13, wherein: the internal links and the external links each have a thickened middle region in the longitudinal direction and thinner overlap regions, which adjoin frontally thereon, and
wherein the opposing first and second stop faces of the second link are provided frontally on the middle region of the second link.

17. The energy guide chain according to claim 16, further comprising:
opposing third and fourth stop faces provided frontally on the middle region of the first link,
third and fourth stop faces provided on the opposing end faces of the second link, and
wherein the opposing third and fourth stop faces provided frontally on the middle region of the first link interact with the third and fourth stop faces on the opposing end faces of the second link, respectively.

18. The energy guide chain according to claim 17, wherein: the opposing third and fourth stop faces of the first link are curved,
wherein the third and fourth stop faces provided on the opposing end faces of the second link are congruently curved, in particular identically curved, preferably according to a sharper curvature than the first and second stop faces.

19. The energy guide chain according to claim 18, wherein:
the opposing third and fourth stop faces of the first link are identically curved, and
wherein the third and fourth stop faces provided on the opposing end faces of the second link are identically curved.

20. The energy guide chain according to claim 19, wherein:
the third and fourth stop faces provided on the opposing end faces of the second link are curved to a sharper curvature than the opposing first stop surface and the opposing second stop faces of the second link.

21. The energy guide chain according to claim 17, wherein:
a curvature of the first and second stop faces of the first and second links and/or a curvature of the third and fourth stop faces of the first and second links allow successive nestling of the stop faces of the first and second links.

22. An energy guide chain comprising:
a plurality of links articulable with one another which form two parallel link strands,
a plurality of transverse webs, wherein the two parallel link strands are connected by the transverse webs,
wherein adjacent links of the plurality of links of each link strand are angleable to one another by an articulable connection,
wherein the articulable connection between the adjacent links comprises at least one joint element, wherein the at least one joint element is elastically deformable such that the adjacent links are angleable to one another in an angling direction,
wherein the at least one joint element is a separate component,
wherein the at least one joint element comprises at least one first snap means, which interacts with a corresponding second snap means of a first link of a pair of the adjacent links,
wherein the first and second snap means form a snap connection to hold the first link on a second link of the pair of adjacent links transversely to a longitudinal direction of the energy guide chain.

23. The energy guide chain according to claim 22, wherein:
the at least one joint element connects at least three links and is arranged in a longitudinal center plane of the links extending in the longitudinal direction of the chain.

24. The energy guide chain according to claim 22, wherein:
the at least one joint element has a plurality of end regions that comprise at least one first snap,
wherein the first snap means of each end region comprises a snap hook.

25. The energy guide chain according to claim 24, wherein:
each snap hook of the joint element is formed by a notch transverse to the longitudinal direction of the chain and comprises a barb,
each end region of said plurality of end regions further comprises at least one protrusion that is molded integrally with the joint element,
and that is provided on each end region on a side of the end region opposite the barb of the snap hook.

26. The energy guide chain according to claim 24, wherein:
the at least one joint element has a plurality of fastening regions, wherein each fastening region comprises at least one thickened, approximately cylindrical area to secure or fasten the joint element to the second link of the pair of adjacent links.

27. The energy guide chain according to claim 22, wherein:
the first and second links have curved stop faces to delimit an end location with least angling between the adjacent links and/or curved stop faces to delimit an end location with greatest angling between the adjacent links.

28. The energy guide chain according to claim 22, wherein:
in each link strand, the adjacent links are internal links and external links, wherein the internal links and the external links alternate in the longitudinal direction of the chain and wherein the internal links are different from the external links,
wherein the internal links and the external links are mirror-symmetrical to a vertical center plane extending perpendicularly to the longitudinal direction,
wherein the internal links and the external links are useable in both link strands, and
wherein the at least one joint element has opposing end regions to secure adjacent internal and external links in the longitudinal direction of the chain.

29. The energy guide chain according to claim 22, wherein:
only every second link of each link strand is connected by the transverse webs, and
wherein the first links are held by the snap connection to the joint element transversely to the longitudinal direction and are held by the joint element to the second links connected by the transverse webs.

30. The energy guide chain according to claim 22, wherein:
the joint element has a maximum width, which at most corresponds to a maximum width of the first and second links.

31. The energy guide chain according to claim 22, wherein:
the joint element has at least one damping extension with a free end for damping between interacting stop faces of the links.

32. The energy guide chain according to claim 22, wherein:
the joint element is formed of a first plastic material that is an elastically deformable, and
the links are formed of a second plastic material which is harder than the first plastic material of the joint element.

33. An energy guide chain comprising:
two link strands, each link strand comprising a plurality of links that are connected to one another in a longitudinal direction of the energy guide chain and that are articulable with one another,
pairs of transverse webs connecting the two link strands and fastening the two link strands to one another in parallel;
wherein each link strand comprises at least one joint element that is elastically deformable and connects adjacent links of the link strand by an articulable connection,
wherein the at least one joint element is separable from the links of each link strand,
wherein the at least one joint element comprises at least one first snap means that interacts with a corresponding second snap means of a first link of two adjacent links to form a snap connection and to secure the joint element on the first link of the two adjacent links in a transverse direction with respect to the longitudinal direction.

34. The energy guide chain according to claim 33, wherein:
the at least one joint element is fastened to the second link of the two adjacent links.

35. The energy guide chain according to claim 33, wherein:
the at least one joint element connects at least three links and is arranged in a longitudinally-oriented main plane of the link strand extending in the longitudinal direction of the energy guide chain.

36. The energy guide chain according to claim 33, wherein:
the at least one joint element has a plurality of end regions that comprise at least one first snap means,
wherein the first snap means of each end region comprises a snap hook.

37. The energy guide chain according to claim 36, wherein:
each snap hook of the joint element is formed by a notch transverse to the longitudinal direction of the chain and comprises a barb,
each end region of said plurality of end regions further comprises at least one protrusion molded integrally with the joint element the at least one protrusion is provided on each end region on a side of the end region opposite the barb of the snap hook.

38. The energy guide chain according to claim 36, wherein:
the at least one joint element has a plurality of fastening regions, each fastening region being opposite to one end region of the plurality of end regions, wherein each fastening region comprises at least one thickened cylindrical area to fasten the joint element to the second link of the two adjacent links.

39. The energy guide chain according to claim 33, wherein:
the first and second links have curved stop faces to delimit an end location with least angling between the adjacent links and/or curved stop faces to delimit an end location with greatest angling between the adjacent links.

40. The energy guide chain according to claim 33, wherein:
only every second link of each link strand is connected by the transverse webs, and
wherein the first links are held by the snap connection to the joint element transversely to the longitudinal direction and by the joint element to the second links connected by the transverse webs.

41. The energy guide chain according to claim 33, wherein:
the joint element is formed of a first plastic material that is elastically deformable, and
the links are formed of a second plastic material which is harder than the first plastic material of the joint element.

\* \* \* \* \*